United States Patent [19]
Miron

[11] Patent Number: 5,906,889
[45] Date of Patent: *May 25, 1999

[54] PAVEMENT MARKING MATERIAL

[75] Inventor: Gary R. Miron, St. Paul, Minn.

[73] Assignee: Minnesota Mining and Manufacturing Company, St. Paul, Minn.

[*] Notice: This patent is subject to a terminal disclaimer.

[21] Appl. No.: 08/856,727

[22] Filed: May 15, 1997

Related U.S. Application Data

[63] Continuation of application No. 08/489,135, Jun. 9, 1995, abandoned, which is a continuation-in-part of application No. 08/153,714, Nov. 16, 1993, Pat. No. 5,453,320, which is a continuation of application No. 07/875,528, Apr. 27, 1992, abandoned, which is a continuation of application No. 07/606,959, Oct. 31, 1990, abandoned.

[51] Int. Cl.[6] .............................. C09J 7/02; B32B 5/16; B32B 7/12
[52] U.S. Cl. ............................ 428/323; 404/14; 404/20; 428/354; 428/355 BL; 428/356
[58] Field of Search .................... 428/212, 323, 428/353, 354, 355 BL, 356, 492; 404/12, 14, 20, 94; 522/110; 525/98

[56] References Cited

U.S. PATENT DOCUMENTS

| | | | |
|---|---|---|---|
| 2,567,671 | 9/1951 | Joesting | 428/356 X |
| 2,956,904 | 10/1960 | Hendricks | 117/93 |
| 3,846,352 | 11/1974 | Bullard et al. | 428/343 |
| 3,902,939 | 9/1975 | Eigenmann | 156/71 |
| 3,976,606 | 8/1976 | Gobran | 260/4 AR |
| 4,022,723 | 5/1977 | Hokama et al. | 260/4 AR |
| 4,037,016 | 7/1977 | Habeck et al. | 428/349 |
| 4,046,838 | 9/1977 | Feeney | 526/237 |
| 4,146,514 | 3/1979 | Matubara et al. | 260/5 |
| 4,146,635 | 3/1979 | Eigenmann | 428/283 |
| 4,151,057 | 4/1979 | St. Clair et al. | 428/461 |
| 4,248,932 | 2/1981 | Tung et al. | 428/325 |
| 4,260,659 | 4/1981 | Gobran | 428/217 |
| 4,288,567 | 9/1981 | Feeney et al. | 525/99 |
| 4,299,874 | 11/1981 | Jones et al. | 428/143 |
| 4,556,464 | 12/1985 | St. Clair | 524/270 |
| 4,634,729 | 1/1987 | Pavlin et al. | 524/285 |
| 4,948,825 | 8/1990 | Sasaki | 524/274 |
| 5,453,320 | 9/1995 | Harper et al. | 428/356 |

FOREIGN PATENT DOCUMENTS

WO 94/11175   5/1994   WIPO.

*Primary Examiner*—James J. Bell
*Assistant Examiner*—Blaine R. Copenheaver
*Attorney, Agent, or Firm*—Robert H. Jordan

[57] ABSTRACT

Pavement marking material comprising a top layer, an optional base sheet, and a layer of adhesive, wherein the adhesive comprises a rubber and a high loading of tackifier. Such adhesives have been found to exhibit exceptional impact shear resistance.

8 Claims, 1 Drawing Sheet

PAVEMENT MARKING MATERIAL

CROSS-REFERENCE TO RELATED APPLICATION

This is a Continuation of application Ser. No. 08/489,135, filed Jun. 9, 1995, now abandoned, which is a continuation-in-part of U.S. patent application Ser. No. 08/153,714, filed Nov. 16, 1993, now U.S. Pat. No. 5,453,320, which is a continuation of application Ser. No. 07/875,528, filed Apr. 27, 1992, now abandoned, which is a continuation of application Ser. No. 07/606,959, filed Oct. 31, 1990, now abandoned.

FIELD OF INVENTION

The present invention relates to a pavement marking material which may be adhered to a roadway to provide traffic control markings and the like.

BACKGROUND

Preformed pavement marking materials are used as traffic control markings for a variety of uses, such as short distance lane striping, stop bars, and pedestrian lane markings at cross walks and lane and shoulder delineators and skips on highways. Typically, preformed pavement marking materials comprise a continuous, preferably wear-resistant top layer overlying a flexible base sheet. Such marking materials are typically applied to road surfaces using pressure-sensitive adhesives or contact cement.

Pavement markings such as markings for crosswalks, stop bars, etc. at intersections, sometimes referred to as "transverse applications", are subjected to very high, very quick shear forces from vehicles which start, stop, and turn at the location. The shear stresses encountered in transverse applications are typically substantially greater than the shear forces typically encountered due to traffic in "long line" or "longitudinal applications" such as lane and shoulder delineators and skips on highways. The adhesives on many markings do not provide desired shear resistance to achieve satisfactory performance in transverse applications.

U.S. Pat. No. 3,902,939 (Eigenmann) discloses a pavement marking tape material which utilizes an adhesive which is not tacky at room temperature but which is activated by a hot primer layer or solvent to provide adhesion to pavement surfaces.

U.S. Pat. No. 4,146,635 (Eigenmann) discloses a road marking tape material designed to better withstand tangential stresses internally by incorporation of an inextensible, tensionally resistant intermediate layer.

U.S. Pat. No. 2,956,904 (Hendricks) discloses use of high energy electron ("e-beam") bombardment of rubber resin type pressure-sensitive adhesives to increase the cohesive properties of the adhesives.

SUMMARY OF INVENTION

The present invention provides an improved pavement marking material which comprises a top layer, optionally a flexible base sheet, and a layer of adhesive. Once applied to road surfaces, pavement marking materials of the invention exhibit exceptional impact shear resistance, thereby providing improved durability and safety.

Briefly summarizing, the adhesive layer of marking materials of the invention comprises a hereinafter described hydrocarbon-based elastomer, preferably an amorphous hydrocarbon elastomer using a solventless hot melt process, and an effective amount of hereinafter described tackifier, e.g., between about 80 and about 125 parts by weight of tackifier per 100 parts by weight of elastomer, i.e., between about 80 and about 125 phr of tackifier.

It is generally well known to those skilled in the art of formulating pressure-sensitive adhesives that increasing the level of tackifying resin in a rubber-resin mixture results in compositions with decreased static shear strength. Surprisingly we have found that increasing the amount of tackifier in a rubber-resin pressure-sensitive adhesive to specified high levels, i.e., about 80 to about 125 phr, results in adhesives which exhibit improved resistance to impact-like shear forces such as are encountered in transverse lane marking applications. The use of such adhesives also allows application of the pavement markings without the need of applying a primer to the surfaces. Although primers work well with adhesives, they have many drawbacks. Because primers are solvent based, they pose a potential flammable hazard. Secondly, the application of primer and adhesive is stepwise and thus time consuming and more costly. Finally, primers contain about 25 to 35% solids capable of releasing hydrocarbons into the environment which have caused some states to bar their use.

Pavement marking materials of the invention are particularly well suited for use to mark crosswalks, stop bars, etc. at intersections, i.e., transverse applications. Pavement marking materials of the invention are also well suited for use in longitudinal applications, e.g., lane and shoulder delineators and skips, and may be used on a variety of pavement surfaces, e.g., concrete and asphalt.

It has been found that pavement markings with an adhesive layer containing a higher range of tackifier will perform better in southern climates.

BRIEF DESCRIPTION OF DRAWING

The invention will be further explained with reference to the drawing, wherein.

DETAILED DESCRIPTION OF ILLUSTRATIVE EMBODIMENTS

Figure 1:
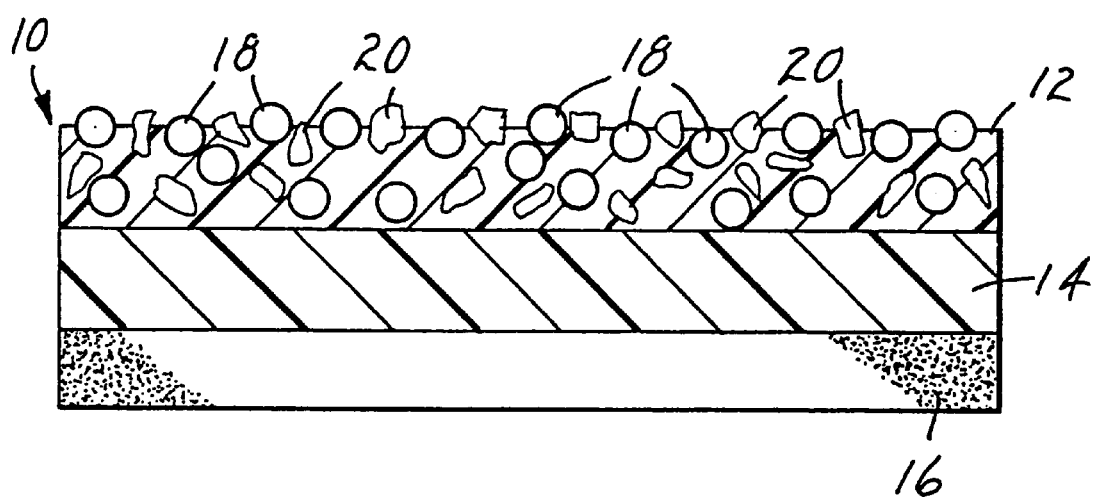
FIG. 1 is a cross-sectional view of a portion of an illustrative embodiment of pavement marking material of the invention. This FIGURE, which is idealized, is not to scale and is intended to be merely illustrative and non-limiting.

As shown in FIG. 1, in a typical embodiment of the invention, pavement marking material 10 comprises top layer 12, optional base sheet 14, and adhesive layer 16 which adheres marking material 10 to a substrate such as the pavement surface of a roadway (not shown).

Adhesive layer 16 comprises rubber and tackifier and may vary in thickness from about 14–50 mils when applied commercially to a substrate. A preferred range of thickness of the adhesive layer is from about 20–27 mils, with a lower range preferred in southern climates and a higher range in northern climates.

Rubbers used herein include those having a low glass transition temperature, i.e., a $T_g$ of between about –120° C. and about –50° C. The rubbers can be lightly crosslinked (preferably by electron beam up to about 4 Mrads) but not to the point of insolubility in toluene. A small weight percentage of chemical crosslinking such as a phenolic resin may be used to increase molecular weight of the rubbers, as an alternative to electron beam. Illustrative examples of suitable elastomers include the following: natural rubber, polyisoprene, polybutadiene, polyisobutylene, butyl rubber, ethylene-propylene rubber, ethylene-propylene-diene monomer rubber (EPDM), poly(ethylene/butylene), poly(alpha-olefin) and styrenebutadiene random copolymer rubber. These may be used singly or in combination and are distinguished from block copolymer types. A preferred rubber is natural rubber.

Tackifiers used in the present invention should be compatible with the rubber component, i.e., they are preferably substantially miscible in all proportions. Tackifiers used in the present invention preferably have a ring and ball softening point between about 70° C. and about 140° C. Illustrative examples of suitable tackifiers include the following types: rosin and rosin derivatives, $C_5$ and $C_9$ hydrocarbon resins, and terpenes and terpene phenolic derivatives. These may be used singly or in combination. A preferred tackifier which is completely miscible with natural rubber is β-pinene.

Useful in the invention are pressure sensitive adhesives (PSAs) preferably produced by a process employing a continuous compounding device. A number of such devices are known. They may comprise a single unit or a series of units interconnected so as to continuously process the elastomer. The device has a sequence of alternating conveying and processing sections which are interconnected. An example of a continuous compounding device useful in the present invention is a twin screw extruder having a sequential series of conveying and processing zones. A plurality of input openings are preferably provided along the length of the extruder to facilitate the addition of various materials such as tackifier resins, fillers, antioxidants, plasticizing aids (if desired), radiation enhancers such as electron beam sensitizers and photoinitiators, light stabilizers and other adjuvants known in the art. Additions of material, whether elastomer, tackifier, or other adjuvants, are made through input ports to a partially full conveying zone or zones. A melt pump and filter may be present either as an integral part of the extruder, or as a separate unit to facilitate both the removal of the adhesive from the compounding device and the removal of unwanted contaminants from the adhesive stream.

In the practice of the process, the elastomer is added to a first conveying zone of the compounding device at a controlled rate so that the elastomer does not completely fill the zone. The elastomer may be pelletized by grinding or extrusion pelletization prior to being fed to the compounding device. Alternately, it may be fed directly into the compounding device without grinding or pelletization using a device such as a Moriyama extruder. If the elastomer has been pelletized, it is preferably treated with a material such as talc to prevent agglomeration of the pellets.

The elastomer is then transported by the first conveying zone to a first processing zone where it is masticated. The first processing zone typically is designed to be essentially completely full and to masticate the elastomer. Additionally, the processing zone conveys the elastomer to the next zone. It may be desirable to provide the first processing zone as at least two discrete processing sections separated from each other by a transporting section. This permits the elastomer to be masticated in steps, with cooling of the masticated elastomer between each step.

If two or more elastomers are to be processed they may both be added to the first conveying zone and masticated in the first processing zone. Alternatively, the elastomers may be added sequentially to different conveying zones with sequential mastication after each elastomer addition. Sequential elastomer addition to different conveying zones may also be employed when a single elastomer is used.

Mastication is preferably carried out in the absence of materials which will lubricate the elastomer and prevent reduction of its molecular weight. This does not however, preclude the presence of small amounts of such materials, provided that the amount present does not effectively reduce the rate of mastication. Certain other solid adjuvants, such as talc, inorganic fillers, antioxidants, and the like, may be fed to the compounding device such that they are present during mastication.

The masticated elastomer then passes from the first processing zone to a second conveying zone. As with the first conveying zone, the second conveying zone is not completely filled by the elastomer. Tackifier, and optionally other additives, are fed to the second conveying zone. The resulting mixture is conveyed to the next processing zone where they are mixed to form a blend of the materials. A number of techniques may be used to feed these materials to the compounding device. For example, a constant rate feeder such as a K-Tron loss-in-weight feeder may be used to add solid materials. Heated pail unloaders, gear pumps, and other appropriate equipment for feeding liquids at a controlled rate may be used to feed the liquids to the compounding device. Additives present at low concentration may be pre-blended with one or more of the other components for more accurate addition.

Although substantially all mastication occurs in the first processing zone, there may be some mastication which occurs in subsequent processing of the elastomer through the compounding device. This additional mastication may occur in subsequent conveying or processing zones. In any event, the degree to which the elastomer must be masticated in the practice of the invention varies with each elastomer employed and the finished product desired. Generally, the elastomer must be sufficiently masticated to (i) permit subsequently added tackifiers and any other adjuvants to be satisfactorily mixed into the elastomer to form a blend and (ii) to permit the blend to be extruded as a stream that is essentially free from both rubber particles and from visually identifiable regions of unmixed tackifier and any other adjuvants.

Once the masticated elastomer, tackifier, and any other adjuvants have been formed into the blend, the composition may now be referred to as an adhesive. This adhesive typically has a viscosity at the processing temperature in the range from 500 Poise to 5000 Poise (measured at a shear rate of 1000 $sec^{-1}$). Higher viscosity adhesives may also be processed in the process of the invention. The processing temperature of the adhesive is typically in the range of 100–200° C.

A twin screw extruder is preferably used as the compounding device. The extruder screw should be configured to masticate the elastomer in the first processing zone prior to addition of the tackifier.

Additionally, if a blend of elastomers is used in the adhesive, the first processing zone preferably allows mastication and blending of the elastomer components. The portion of the extruder and screw following the first processing zone must be designed to permit the addition of the tackifier and other additives to the elastomer and good mixing of the elastomer with these materials. Preferably, the screw is designed so that a homogeneous adhesive composition results.

The design of the screw to achieve mastication, conveying and blending follows normal practices known in the art. Namely, the screw has a sequence of conveying and processing zones. Flow restriction and mixing elements are provided so as to achieve appropriate flow along the screw and obtain appropriate mastication and mixing. The conveying zones may contain ordinary Archimedes screw elements. The processing zones may contain kneading blocks, pin mixers, or other elements designed for mastication, compounding and mixing. Flow restriction elements, such as kneading blocks arranged with a reverse pitch, reverse pitched conveying screws, a disk element or other device designed to restrict the flow of material, may also be present in the processing zone to ensure that the portion of the processing zone preceding these elements tends to run full of material while the conveying zone following them tends to run only partially full.

Typically, the adhesive composition comprises between about 80 and about 125 phr of tackifier such that the adhesive has excellent impact shear resistance while maintaining sufficient degree of tack to adhere to a substrate. Adhesive compositions which contain insufficient amounts of tackifier typically tend to exhibit lower impact shear resistance and may tend to be displaced from the substrate upon multiple shearing impacts. Adhesive compositions which contain excessive amounts of tackifier typically tend to be more difficult to bond to a substrate and require use of a primer to overcome this difficulty. They also may be more likely to undergo brittle failure and pop off the substrate, especially at low temperatures. Optimum tackifier loading is dependent upon the softening point of tackifier; relatively low softening point tackifiers being less effective than relatively high softening point tackifiers in reinforcing the adhesive at equal tackifier loading levels.

The portion of the adhesive layer which is to be applied to the substrate, i.e., bottom portion of the adhesive, preferably has a Static Shear, determined according to the test described below, of less than about 2000 seconds.

The surface to which a pavement marking of the invention is applied is preferably substantially dry to ensure effective bonding.

The adhesive and the layer which it is in contact with, either top layer 12 or optional base sheet 14, should be selected such that they bond strongly enough together to resist delamination under conditions to which the pavement marking is exposed.

Top layer 12 is typically a flexible polymeric layer which is preferably durable and wear-resistant. Illustrative examples of materials from which top layers may be made include polyvinyls, polyurethanes, epoxy resins, polyamides, polyureas, and polyesters. Mixtures of such materials may be used. Suitable polymeric materials may be either thermoplastic or thermosetting polymers.

In many embodiments, top layer 12 will also comprise a plurality of retroreflective particles 18 and/or skid-resistant particles 20 embedded in top layer 12 with some particles protruding from the top surface of top layer 12 as known to those skilled in the art. For instance, embodiments of the invention may be made with top layers containing skid-resistant particles as illustrated in U.S. Pat. No. 3,935,365 (Eigenmann).

Illustrative examples of retroreflective particles 18 which are suitable for use in pavement marking materials of the invention include glass microspheres having an index of refraction between about 1.5 and about 2.0, typically preferably between about 1.8 and about 1.95. Glass microspheres having an index of refraction closer to about 1.5 are typically less costly and more durable than those having higher indexes of refraction, whereas those having an index of refraction between about 1.8 and about 1.9 typically tend to provide high retroreflective efficiency. It will be understood by those skilled in the art that other embodiments of retroreflective particles 18 may be used in marking materials of the invention.

Skid resistant particles 20 are preferably used to impart greater frictional properties to the marking material. For example, skid resistant particles may be selected of proper type and sufficient quantity that the marking material has a skid resistance in the British Portable Skid Resistance Test of at least 50 BPN. BPN means the British Portable Number as measured using a Portable Skid Resistance Tester built by Road Research Laboratory, Crawthorne, Berkshire, England. White aluminum oxide granules are an illustrative example of suitable skid-resistance particles. Another illustrative example is ceramic spheroids that are a fired ceramic comprising a mineral particulate, alumina, and a binder.

In some embodiments, particles 18 and 20 may be treated with a coupling agent that improves adhesion between particles 18 and 20 and the polymeric components of top layer 12. Alternatively, a coupling agent may be incorporated in the composition from which top layer 12 is formed. Coupling agents typically comprise an inorganophilic portion, which associates with particles 18 and 20, and an organophilic portion, which associates with the organic components of top layer 12. Silane compounds, e.g., aminosilanes, are an illustrative example of typically suitable coupling agents.

Optional base sheet 14 is typically between about 20 and about 50 mils (0.8 and 2 microns) thick to impart desired conformability and strength to marking material 10. If base sheet 14 is too thin, it may not provide sufficient strength or support for marking material 10 to enable material 10 to be handled and applied to a roadway. If base sheet 14 is too thick, resultant marking material 10 may tend to stick up so far from the pavement to which it is applied as to be too readily subject to damage or dislodgment by snowplows.

Base sheet 14 and/or top layer 12 may also comprise particulate fillers to lower the cost as well as modify the properties, e.g., reinforcement, surface hardness, flexibility, etc., of base sheet 14, top layer 12, and overall marking material 10.

Optionally, coloring agents such as pigments may be added to base sheet 14 and/or top layer 12 to impart desired coloration. Illustrative examples of suitable coloring agents include titanium dioxide pigment which provides white color and lead chromate pigment which provides yellow color.

In other embodiments, pavement markings may be made using adhesive layers as described herein with top layers presenting reflective elements as disclosed in U.S. Pat. No. 3,587,415 (Eigenmann).

Typically, pavement markings of the invention will be wound into roll form for storage with a suitable low adhesion backsizing or release agent applied to the top surface of the pavement marking backing before rolling.

EXAMPLES

The invention will be further explained by the following illustrative examples which are intended to be nonlimiting. Unless otherwise indicated, all amounts are expressed in parts by weight.

Unless otherwise indicated, the following test methods were used. Unless otherwise indicated, the tests were performed at room temperature.

Rolling Ball Tack

Rolling Ball Tack was determined by allowing a clean stainless steel ball weighing about 8.35 grams and having a diameter of about 0.5 inch (1.2 centimeters) to roll down a ramp with a 20° slope from a total vertical height of about 2.1 inches (5.3 centimeters) onto a horizontal layer of the subject adhesive. The distance from the end of the ramp to where the ball came to a stop was measured and reported as Rolling Ball Tack. This procedure is similar to Pressure Sensitive Tape Council Test Method PSTC-6.

Solvent Resistance

Solvent Resistance was determined by immersing a 1 inch (2.5 centimeter) square piece of the subject adhesive on polyester backing in toluene for 24 hours. After the 24 hours period, the samples were evaluated and found soluble indicating that the adhesives were substantially uncrosslinked.

Static Shear

Static Shear was determined by applying a 0.5 by 4 inch (1.2 by 10 centimeter) strip of a test tape comprising a 7 mil (25 micrometer) film of the subject adhesive on a 2 mil (50 micrometer) polyester terephthalate film to a stainless steel panel with a 0.5 by 0.5 inch (1.2 by 1.2 centimeter) portion of the tape in contact with the panel and the remainder extending beyond. The sample was laminated to the test panel by hand rolling with a 2 kilogram roller for six passes. The test panel was then suspended in a test stand at a 2° angle from vertical with the tape on the upper surface of the panel such that no gravity-induced peel force would be applied to the tape. After allowing the sample to equilibrate for 10 minutes at about 150° F. (65° C.), a 500 gram weight was suspended from the tape, using a hook that evenly distributed the weight across the full width of the sample. The sample was then allowed to remain at about 150° F. (65° C.) until the tape slid completely from the steel panel, with the elapsed time noted as Time-To-Fail. This procedure is similar to Pressure Sensitive Tape Council Test Method PSTC-7.

Impact Shear Resistance

Impact Shear Resistance was determined using a vehicle wear simulator designed to simulate shear and wear conditions experienced by a pavement marking located near an intersection. The simulator has a test area consisting of a horizontal annular ring about 6 feet (1.8 meters) in diameter and about 1 foot (0.3 meter) in width having an unprimed concrete surface. Samples of pavement marking material are cut into 2 by 6 inch (5 by 15 centimeter) rectangles and mounted in the annular ring with the long axis of the sample being aligned with the radial axis of the ring. Each sample is then rolled by hand with a rubber roller to provide good contact to the unprimed pavement surface and its initial position noted. Two tires, B. F. Goodrich P165/80R13 steel belted radials with an inflation pressure of 30 pounds/inch$^2$ ($2.1 \times 10^5$ Pascals), are positioned vertically above the test area at opposite ends of a rigid connecting frame. Downward pressure is applied to the connecting frame pneumatically to provide a load of between about 420 and about 440 pounds (about 190 and about 200 kilograms) on each tire. The frame is rotated, driving the tires across the surface of the test area at 60 revolutions/minute which is equivalent to a lineal tire speed of about 12.5 miles/hour (20 kilometers/hour), simulating the high impact shear and abrasion forces encountered at a highway intersection. Impact Shear Resistance was evaluated as the lateral movement of the sample on the substrate following a specified number of tire hits.

Example 1

The following samples were prepared and tested using the above described tests in the laboratory to demonstrate the effect that tackifier has on impact shear properties and the effect of adhesive thickness on both resistance to impact type shear (VWS, Vehicle Wear Simulator) and physical property measurements (i.e., static shear and rolling ball tack).

Natural rubber (technical grade—SMRCV-60, (i.e., Standard Malaysian Rubber Controlled Viscosity where 60 refers to a Mooney research #) was used in this experiment. A 20% solids solution of this rubber in toluene was made up. The solution was very thick (i.e., high viscosity) but showed no evidence of any gel structure. At the same time a 40% solution of Piccolyte S-115, a β-pinene tackifying resin from Hercules, was made. The following formulations (Lot #) were made up using varying ratios of tackifier and rubber solutions based on 100 parts by weight of rubber in each sample.

The results are shown in Tables 1 and 2.

TABLE 1

| | | Static Shear Properties | | |
|---|---|---|---|---|
| LOT # | Tackifier Level PHR | Adhesive Thickness mils | 150 F Shear to Steel TTF (sec) 500 gram Weight | 150 F Shear to Steel TTF (sec) 200 gram Weight | Tack Property Rolling Ball Tack inch |
| 1.1 | 100 | 3.0 | 10 | 183 | 5.0 |
| 1.2 | 100 | 5.5 | 12 | 136 | 1.9 |
| 1.3 | 100 | 9.0 | 12 | 117 | 1.2 |
| 2.1 | 125 | 3.1 | 11 | 135 | >16 |
| 2.2 | 125 | 6.5 | 10 | 91 | 8.3 |
| 3.2 | 150 | 8.5 | 10 | 66 | >16 |
| 4.1 | 175 | 3.2 | 16 | 99 | >16 |
| 4.2 | 175 | 6.0 | 11 | 70 | >16 |
| 4.3 | 175 | 8.3 | 10 | 59 | >16 |
| 5.2 | 200 | 6.5 | 16 | 70 | >16 |
| Control | 175 | 6.0 | 60 | — | >16 |

TTF = Time to Failure

TABLE 2

| | | Vehicle Wear Simulator Test Results average of 3 samples | | | | | | | | | | | | |
|---|---|---|---|---|---|---|---|---|---|---|---|---|---|---|
| LOT # | # HITS | 10000 | 30000 | 60000 | 90000 | 120000 | 150000 | 190000 | 210000 | 250000 | 300000 | 350000 | 400000 | 450000 | 510000 |
| | | Numbers Listed Below are Millimeters of Movement After # of Hits | | | | | | | | | | | | | |
| 1.1 | | 48 | 75 | 75 | 75 | 75 | 75 | 75 | 75 | 75 | 75 | 75 | 75 | 75 | 75 |
| 1.2 | | 1 | 19 | 35 | 53 | 60 | 66 | 72 | 74 | 75 | 75 | 75 | 75 | 75 | 75 |
| 1.3 | | 0 | 2 | 11 | 25 | 46 | 57 | 65 | 69 | 71 | 75 | 75 | 75 | 75 | 75 |
| 2.1 | | 25 | 75 | 75 | 75 | 75 | 75 | 75 | 75 | 75 | 75 | 75 | 75 | 75 | 75 |
| 2.2 | | 0 | 0 | 3 | 8 | 24 | 40 | 53 | 52 | 52 | 54 | 55 | 56 | 57 | 60 |
| 3.2 | | 0 | 6 | 18 | 24 | 28 | 34 | 42 | 48 | 50 | 52 | 53 | 53 | 54 | 55 |

TABLE 2-continued

Vehicle Wear Simulator Test Results
average of 3 samples

| LOT # | # HITS | 10000 | 30000 | 60000 | 90000 | 120000 | 150000 | 190000 | 210000 | 250000 | 300000 | 350000 | 400000 | 450000 | 510000 |
|---|---|---|---|---|---|---|---|---|---|---|---|---|---|---|---|
| | | \multicolumn{14}{c}{Numbers Listed Below are Millimeters of Movement After # of Hits} |
| 4.1 | | 1 | 9 | 23 | 32 | 46 | 50 | 58 | 62 | 65 | 70 | 73 | 73 | 74 | 75 |
| 4.2 | | 0 | 0 | 3 | 5 | 12 | 13 | 22 | 27 | 29 | 35 | 43 | 50 | 55 | 62 |
| 4.3 | | 1 | 1 | 3 | 3 | 7 | 9 | 12 | 16 | 16 | 17 | 22 | 25 | 29 | 35 |
| 5.2 | | 1 | 3 | 3 | 6 | 9 | 10 | 13 | 14 | 15 | 17 | 21 | 25 | 30 | 36 |
| Control | | 2 | 7 | 18 | 27 | 30 | 34 | 47 | 54 | 63 | 71 | 75 | 75 | 75 | 75 |

Sample Removed After 75 mm of Movement

The data from tables 1 and 2 indicate the following:

1. Impact shear resistance can be improved by increasing the level of tackifying resin in the adhesive even for uncrosslinked adhesives.

2. Higher static shear (time it takes a ½" *½" piece of tape to slide off of a steel panel) does not correlate to good impact shear resistance.

3. For a Natural rubber β-Pinene adhesive at 150 phr of resin, the tack (i.e., the ability to make a bond to a substrate with moderate pressure and short times) goes to zero.

4. In some borderline cases, some level of tack can be brought back by using thicker adhesive levels. (Sample 2.1 & 2.2 in table 1).

5. Impact shear resistance can be improved by using thicker adhesive layers.

Example 2

General Experimental Procedures:

In order to determine the effect of various climatic conditions on the performance levels of the tapes and adhesives, field evaluations were done at various confidential test deck sites. Testing was done in St. Paul (cool and wet), and Fort Lauderdale, Florida (hot and wet). In order to maximize the number of different samples evaluated in any given intersection, the following layout was used. Four 1' by 4' sections of tape were laid down in the crosswalk to form a (2' by 8') continental block (the long direction parallel with traffic flow). Usually each block had four different samples or three different samples and a control. Typically an intersection could have as few as 50 or as many as 100 such blocks. For any given experimental design, a minimum of three replicates (of each sample) were applied at each deck. Placement of the samples throughout the intersection was mapped out prior to installation to ensure that replicates of a particular formulation were evenly distributed throughout the various environments. For example: In a typical intersection, turn lanes are a more severe environment (due to higher shear levels encountered there) then straight thru lanes. If all the replicates of a particular formulation are placed in blocks that are just in straight thru lanes, then the sample may artificially appear good whereas in reality the formulation could perform poorly in a high shear environment.

Using the process described above, the following adhesive formulation was anaerobically compounded and coated out onto differential release liner. A controlled Mooney viscosity natural rubber (SMR CV60) (available from The Ore and Chemical Company, Inc.) was ground and dusted with talc. This rubber was fed to Zone 1 of a co-rotating twin screw extruder (ZSK-90 Werner-Pfeiderer Co.) at the rate of 124 lbs./hr. (56.3 kg/hr). The extruder screw operated at 250 rpm. The rubber was transported and masticated through Zones 3 and 4. Piccolyte™ S-115 tackifier was added to Zone 4 at the rate of 49.8 lbs/hr (22.6 kg/hr). Additional Piccolyte™ S-115 was added to Zone 5 at the rate of 74.6 lbs/hr (33.9 kg/hr). Irganox™ 1010 was added with the tackifier stream at Zone 5 at the rate of 1.2 lbs/hr (.55 kg/hr). The adhesive was metered to a 14 inch (35.6 cm) wide contact extrusion die with a rotating steel rod on the downstream side of the die gap to smear the adhesive onto the tight side of a differential release liner. The adhesive was applied at a rate of 250 lbs/hr (113.5 kg/hr) and coated to a width of approximately 14 inches (35.6 cm). The line speed was automatically adjusted to achieve a coating thickness of 20 mils (508 μm). The melt temperature was maintained at approximately 110° C. throughout the extruder. The adhesive was exposed in line to electron beam radiation at a dose of 1 MRad using an accelerating potential of 210 kV. The resulting adhesive was laminated to N-420, a preformed lane marking material made by 3M. The resulting tape was found to be useful as a primeness intersection lanee marking tape.

Example 3

Using the process and materials described in Example 1, the following adhesive formulation was compounded and coated onto release liner for later lamination to a lane marking tape. Ground natural rubber was fed to Zone 1 of the extruder at a rate of 66.4 lbs/hr (30.1 kg/hr). Tackifier was added with the rubber stream into Zone 1 at the rate of 10 lbs/hr (4.5 kg/hr). Temperatures in Zones 1–3 were set to approximately 40° C. Tackifier was added to zone 4 at the rate of 19.9 lbs/hr (9.0 kg/hr). Additional tackifier was added at Zone 5 at the rate of 53.1 lbs/hr (24.1 kg/hr). Temperature in Zones 4 and 5 was set to 66° C. Antioxidant was added to Zone 5 tackifier stream at the rate of 0.7 lbs/hr (0.32 kg/hr). The adhesive was applied at a rate of 150 lbs/hr (68.1 kg/hr) and coated to a width of 14 inches (35.6 cm). The line speed was automatically adjusted to maintain a coating thickness of 7 mils (177 μpm). The adhesive was exposed in line to 1 Mrad of electron beam radiation at 175 kV accelerating voltage.

Example 4

Example 2 was repeated except line speed was adjusted to maintain a coating thickness of 13 mils (330 μm) and electron beam accelerating voltage was increased to 192 kV.

Example 5

Example 2 was repeated except electron beam dosage was increased to 4 Mrads.

Example 6

Example 3 was repeated except electron beam dosage was increased to 4 MRads.

Example 7

Using the process and materials described in Examples 2–6, two adhesive formulations were made with three levels of cure. The effect of cure and tackifier loading on 150° F. Static Shear is demonstrated in Table 3. As is well known by those skilled in the art, static shear increases with increasing levels of cure and decreases with increasing levels of tackifying resin.

TABLE 3

Effect of Tackifier Level and Electron Beam Dose on Static Shear

| Tackifier Level (phr) | Dose (MRads) | | |
|---|---|---|---|
| | 1 | 2 | 3 |
| 100 | 100 | 262 | 501 |
| 125 | 39 | 131 | 109 |

Numbers Listed in Table are Times to Failure (sec)

Example 8

Using adhesives produced in Examples 2–5, a $2^3$ designed experiment was run to evaluate the effects of various parameters on road adhesion. The variables looked at and their levels were; tackifier level (100 and 125 phr), cure level (1 and 4 Mrads) and adhesive thickness (20 and 27 mils). All adhesive samples were laminated to N-420, a preformed pliant polymer lane marking tape with a wear-resistant topcoat available from 3M Company. Adhesive thickness was achieved by using multiple laminates to build up to the desired thickness. Samples were applied in a confidential intersection test deck in Fort Lauderdale, Florida (hot and wet climate). 1 ft. by 4 ft. tape samples were grouped together to form 2 ft. by 8 ft. continental blocks. Twelve replicates per formulation were run in this installation. No primer was used to apply the tape. The road surface was blown off with a gas operated leaf blower and the tape adhered to the road. Tampering was done with a 200 lb tamping cart. Average daily traffic (ADT) was 40,000.

After 13 months, only two samples are missing out of the 96 put down. Tape appearance and wear appear to be noticeably better for the samples with high tackifier loading, i.e., 125 phr. Low tackified adhesives, 100 phr, appear to exhibit some squirm which results in the pliant polymer breaking up a little more.

Example 9

A similar experiment as Example 6 was run in St. Paul, Minn. (cool and wet climate) except an additional level of tackifier was evaluated (80 phr) in this full design. Six replicates were run per formulation. After 9 months in this confidential test deck, only two formulations showed zero failure, high tackifier level, high thickness and low cure and low tackifier level (80 phr) low thickness and low cure. Overall 65% of the low cure samples remained down, while only 37% of the high cure samples were present after this time. The ADT was 15,000.

Various modifications and alterations of this invention will become apparent to those skilled in the art without departing from the scope and spirit of this invention.

What is claimed is:

1. A pavement marking material comprising a top layer having a plurality of retroreflective particles, skid-resistant particles or a mixture thereof, a layer of adhesive, and an optional base sheet between said top layer and said layer of adhesive; said adhesive being an amorphous hydrocarbon elastomer prepared using a solventless hot melt process and comprising:

a) a rubber having a glass transition temperature between about −120° C. and about −50° C., uncrosslinked or crosslinked but soluble in toluene; and b) a tackifier having a ring and ball softening point of between about 70° C. and about 140° C., said adhesive comprising between about 80 to about 125 parts by weight of said tackifier per 100 parts by weight of rubber.

2. The marking material of claim 1 wherein said rubber is selected from at least one of the following: natural rubber, polyisoprene, polybutadiene, polyisobutylene, butyl rubber, ethylene-propylene rubber, ethylene-propylene-diene monomer rubber, poly(alpha-olefin) and styrene-butadiene random copolymer and mixtures thereof.

3. The marking material of claim 1 wherein said rubber consists essentially of natural rubber.

4. The marking material of claim 1 wherein said tackifier is selected from at least one of the following: terpenes and terpene phenolic derivatives, rosin and rosin derivatives, and $C_5$ and $C_9$ hydrocarbon resins.

5. The marking material of claim 1 wherein said tackifier consists essentially of β-pinene.

6. The marking material of claim 1 wherein the bottom portion of said adhesive layer has a Static Shear of less than about 2,000 seconds.

7. The marking material of claim 1 wherein the adhesive layer is from about 14 to about 50 mils thick.

8. The marking material of claim 1 wherein said adhesive comprises natural rubber and between about 80 to about 125 parts by weight of β-pinene per 100 parts by weight of natural rubber wherein the adhesive layer is from about 20 to about 27 mils thick.

* * * * *

UNITED STATES PATENT AND TRADEMARK OFFICE
CERTIFICATE OF CORRECTION

PATENT NO. : 5,906,889
DATED : May 25, 1999
INVENTOR(S) : Gary R. Miron

It is certified that error appears in the above-identified patent and that said Letters Patent is hereby corrected as shown below:

Column 10,
Line 35, "Lanee" should read -- Lane --.
Line 53, "(177upm)." should read -- (177 $\mu$m) --.

Signed and Sealed this

Eighteenth Day of October, 2005

JON W. DUDAS
*Director of the United States Patent and Trademark Office*